United States Patent [19]

Huang

[11] Patent Number: 5,254,140
[45] Date of Patent: Oct. 19, 1993

[54] PLANT TRANSFERRING AND TRANSPLANTING SYSTEM

[76] Inventor: Barney K. Huang, 3332 Manor Ridge Dr., Raleigh, N.C. 27603

[21] Appl. No.: 667,188

[22] Filed: Mar. 11, 1991

[51] Int. Cl.⁵ ............................................. A01G 9/08
[52] U.S. Cl. ....................................... 47/1.01; 47/901
[58] Field of Search .................... 47/901, 1 A, 1.01

[56] References Cited

U.S. PATENT DOCUMENTS

| | | | |
|---|---|---|---|
| 3,012,370 | 12/1961 | Lortz et al. | 47/901 |
| 4,106,414 | 8/1978 | Vastag | 47/1 A |
| 4,926,583 | 5/1990 | Hamilton | 47/901 |
| 5,142,816 | 9/1992 | Tetenburg | 47/1.01 |

FOREIGN PATENT DOCUMENTS 8303761 6/1985 Netherlands ................. 47/1 A
9010377 9/1990 World Int. Prop. O. ........... 47/901

Primary Examiner—Ramon S. Britts
Assistant Examiner—Joanne C. Downs
Attorney, Agent, or Firm—Rhodes, Coats and Bennett

[57] ABSTRACT

The present invention entails a plant transfer system basically comprising a vacuum chamber that is operative to induce young potted plants to a receiving area or receptacle such as a pot or cavity within a plant tray. In the embodiment disclosed herein the plant transfer system has the capability of transferring a set of multi-plants simultaneously, and then to shift a supply tray to a subsequent position and then to transfer a second set of multi-plants. In addition, the plant transfer system of the present invention is specifically designed and adapted such that it can be utilized internally within a greenhouse.

10 Claims, 8 Drawing Sheets

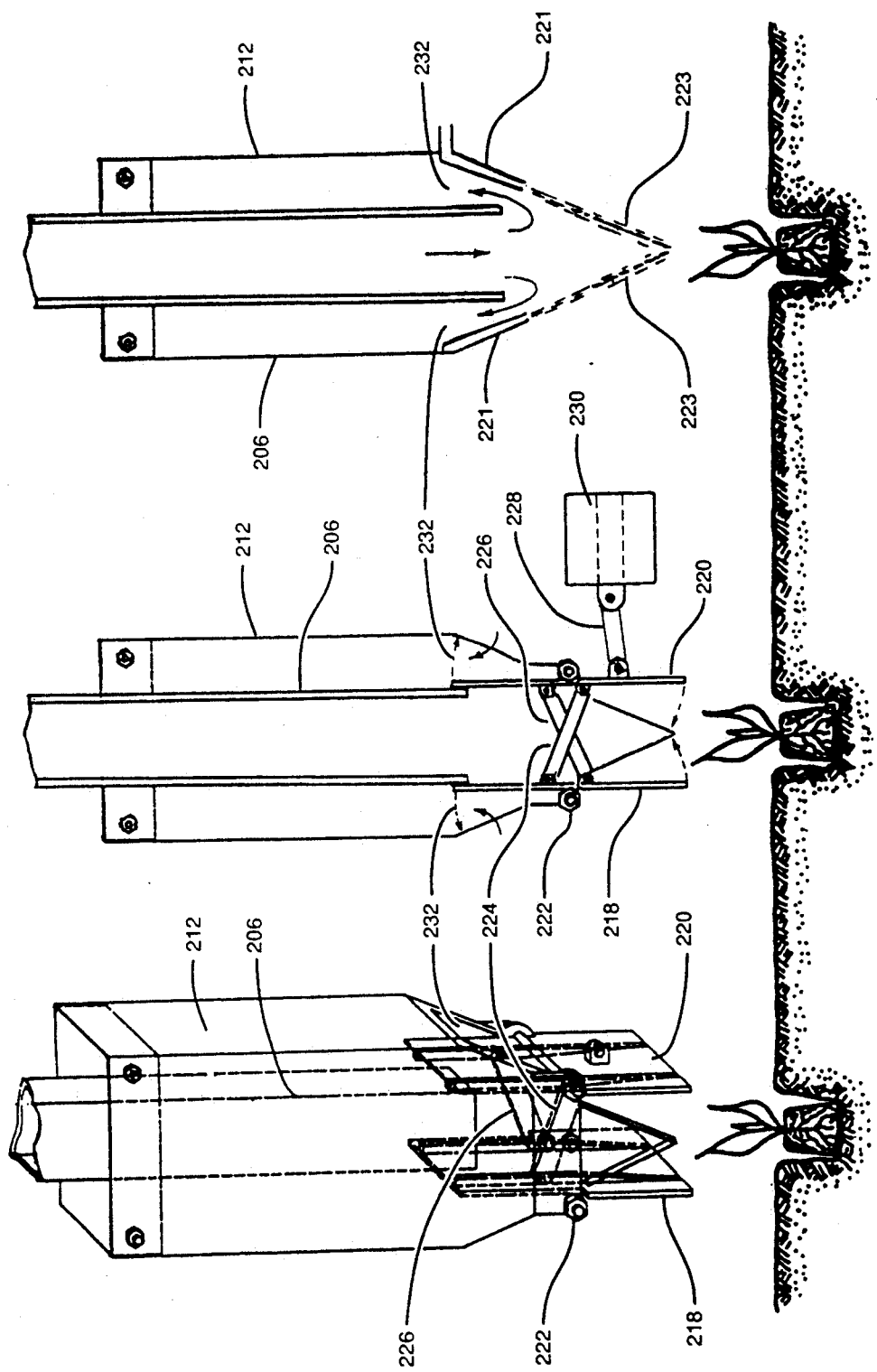

PLANT TRANSFERRING AND TRANSPLANTING SYSTEM

FIELD OF INVENTION

The present invention relates to automatic plant transfer systems, and more particularly to a multi-plant vacuum induced plant transfer system for automatically transferring one or more plants from a supply container to a second container.

BACKGROUND OF INVENTION

Mechanization is as important for the nurserymen as it is for any other field of agriculture. This is because there is a tremendous amount of labor involved in the operation of a nursery, and the nurseryman has to contend with the problems of scarcity of labor and overall labor costs just as any other business.

One particular labor intensive area is that of transferring relatively young and small plants from their initial rooting container to a larger plant container for further growth and development. A great deal of nurseries and plant producing facilities generally perform this operation by hand. Consequently, such plant transfer systems are time consuming and very inefficient. As a practical matter, the use of manual labor to transfer such plants severely limits the capacity of a nursery for handling such transfer operations.

Therefore, there is and continues to be, a need for a fully automatic plant transfer system that will automatically transfer plants from an initial growing tray or container to a a transfer area or second container for further growth and development.

SUMMARY AND OBJECTS OF THE INVENTION

The present invention entails a vacuum actuated automatic plant transfer system for transferring one or more plants at a time from one plant container to a transfer area such as another container. Specifically, the plant transfer system is operative to receive a supply tray having a plurality of plants therein. By utilizing a vacuum chamber, the plant transfer system of the present invention is designed to transfer one or more plants at a time from the supply tray to a corresponding number of plant containers disposed at a filling station disposed underneath the supply tray. In addition, after the first plant or series of plants is transferred from the supply tray, the plant transfer system of the present invention is operative to convey the filled containers from the filling position and to advance a selected number of empty plant containers to the filling station. Also, the plant transfer system is operative to move the supply tray with respect to the vacuum chamber such that a second set or group of potted plants can be transferred from the supply tray to the now underlying plant containers.

Beyond the above, the plant transfer system of the present invention is designed to be utilized in a greenhouse. This enables the transfer of plants from one container to another within the greenhouse itself.

It is therefore an object of the present invention to provide an automatic plant transfer system for transferring one or more potted plants from one container to a transfer area or second container.

Another object of the present invention resides in the provision of an automatic plant transfer system that utilizes a vacuum chamber for inducing the movement of plants from a supply tray to an adjacent tray or container.

A more specific object of the present invention resides in the provision of a vacuum actuated automatic plant transfer system that is capable of transferring a plurality of potted plants at a time from a supply tray to an adjacent container.

A further object of the present invention resides in the provision of a plant transfer system that has the capability of transferring a set of multiple plants from a supply tray at one time, with the plant transfer system being further adapted to move the entire supply tray from one position to another position with respect to a vacuum chamber such that various sets of potted plants can be sequentially moved or transferred from the supply tray.

It is also an object of the present invention to provide a plant transfer system of the character referred to above that is provided with conveyor means for sequentially conveying sets of plant containers to be filled to a filling station disposed underneath the supply tray and to advance the conveyor means in time relationship to the sequential movement of the supply tray such that after one set or group of potted plants has been transferred from a supply tray to an underlying series of containers, those filled containers are advanced from the filling position and the set of empty containers is then advanced by the same conveyor means to where they assume the filling position.

Still a further object of the present invention resides in a plant transfer system of the character referred to above that is designed to be compatible with a greenhouse structure such that the same can be used and housed therein.

A further object of the present invention is to provide an automatic plant transfer system that is relatively simple in construction and which is reliable.

Another object of the present invention is to provide a plant transfer system for automatically transferring groups of plants from an open bottom supply tray by actually pulling selected plants from and through the open bottom of the supply tray.

Still a further object of the present invention is to provide an automatic plant transfer system of the matrix type where one group of plants forming a matrix within a supply tray is transferred and thereafter the entire supply tray is shifted to a second position such that another like matrix of plants can be transferred and wherein this process is continued until the entire supply tray is emptied.

Other objects and advantages of the present invention will become apparent and obvious from a study of the following description and the accompanying drawings which are merely illustrative of such invention.

BRIEF DESCRIPTION OF DRAWINGS

FIG. 6 illustrating the supply tray being moved one plant increment to the left and the transfer of a third set of twenty-four potted plants; FIG. 7 illustrating the supply tray being moved one plant increment downwardly from the position shown in FIG. 6 and the transfer of a second set of twenty-four potted plants; and finally, FIG. 8 showing the supply tray being moved to the right one plant increment from that shown in FIG. 7 and the transfer of a fourth set of twenty-four potted plants.

FIG. 9a is a sectional functional view of the structure of the drop tube and vacuum chamber of the plant transfer system shown in FIG. 9.

FIG. 9b is a sectional functional view of the structure shown in FIG. 9a.

FIG. 9c illustrates an alternate design for the plant transfer system of the present invention where the doors shown in FIGS. 9a and 9b are replaced by an air jet arrangement.

THE PLANT TRANSFER SYSTEM

Figure 1:
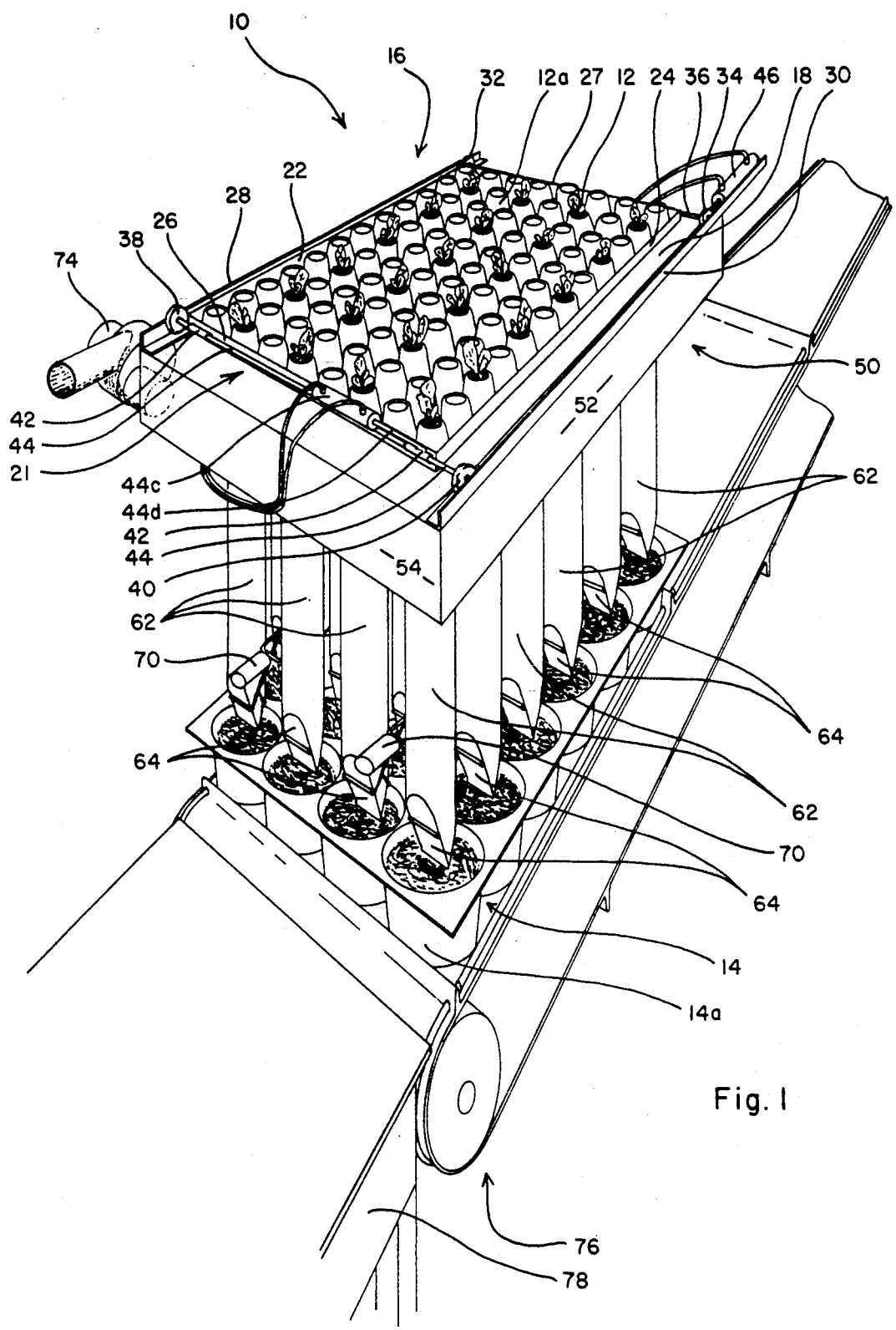
FIG. 1 is a perspective view of the plant transfer system of the present invention illustrating the transfer of potted plants from a supply tray to a series of individual pots forming a part of a second tray.
Figure 2:
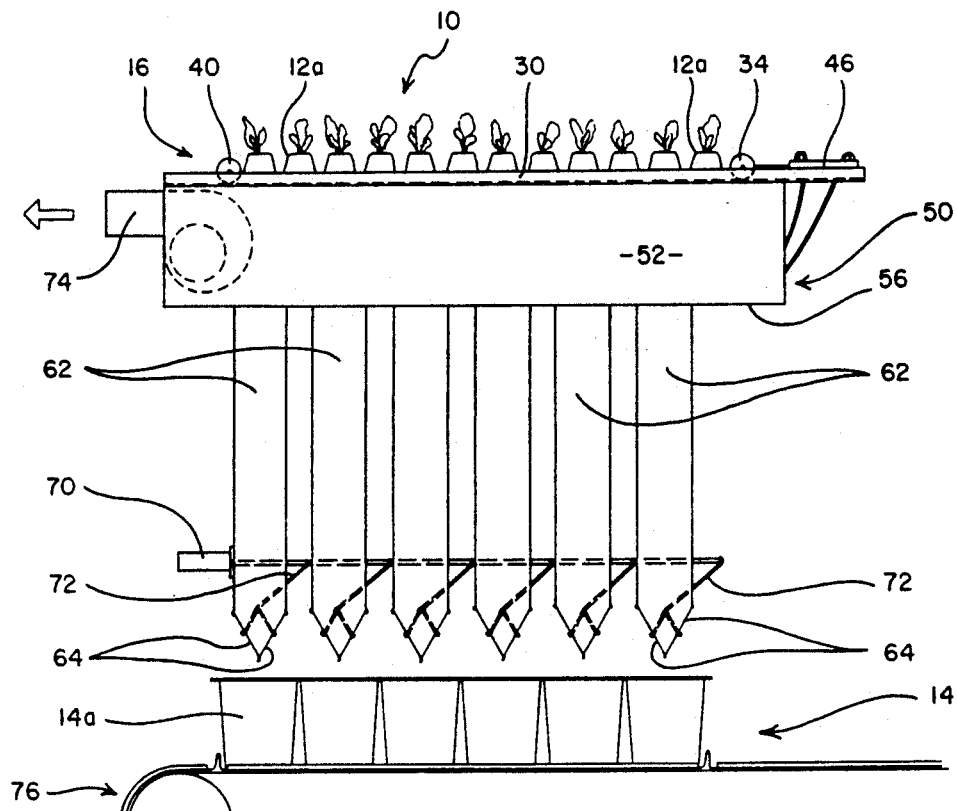
FIG. 2 is a side elevational view of the plant transfer system of the present invention.

With further reference to the drawings, the plant transfer system of the present invention is shown therein and indicated generally by the numeral 10. As will be appreciated from subsequent portions of this disclosure, the plant transfer system 1 is designed to transfer one or more plants at a time from a supply tray to a receiving area such as an additional pot or tray or even to a planting environment.

The present plan transfer system 10 is designed to receive a plant supply tray such as plant supply tray 12 shown in the drawings. Supply tray 12 is a conventional and known plant tray that includes an open bottom and a plurality of plant cavities 12a formed in the tray. It is noted that supply tray 12 disclosed and discussed herein is of the type designed such that the individual plants supported within the tray are required to be removed form the tray through the bottom of the tray itself. Note in FIG. 3 that each plant cavity 12a is of a generally upwardly tapered or frusto-conial shape. Since the respective plant cavities 12a of supply tray 12 are so shaped, this dictates that the respective potted plants carried and supported within the tray must be removed from the bottom thereof.

Plant transfer system 10 is designed to transfer respective potted plants from supply tray 12 to plant receiving means. In the present disclosure the plant receiving means is illustrated by plant receptacle means 14 that could include a tray-type structure or even individual separated pots. Moreover, the receiving area could be a field environment.

Turning now to a discussion of plant transfer means 10, the same comprises a supply tray holding means indicated generally by the numeral 16. Supply tray holding means 16 comprises a flat bottom structure 18 that is designed to lie adjacent the bottom area of supply tray 12. Flat bottom 18 includes therein opening means 20. Opening means 20 could include a single opening or a plurality of openings that are particularly spaced with respect to the individual cavities 12a of the supply tray 12. This allows select cavities 12a of the supply tray 12 to align with openings 20 when the supply tray assumes a selected position thereover. In any event, as will be understood and appreciated from subsequent portions of this disclosure, the function of the opening means 20 is to permit select potted plants to pass therethrough as they move from the supply tray 12.

To contain and control supply tray 12, plant transfer system 10 comprises a X-Y type movable rectangular frame indicated generally by the numeral 21. Rectangular frame 21 includes a pair of opposed sides 22 and 24 and an end side 26. Sides 22, 24 and 26 define a three sided receiving area for receiving and holding supply tray 12. Supply tray 12 can be inserted within the rectangular frame 21 from the open side opposite end side 26.

Secured to the top of flat bottom 18 is a pair of laterally spaced rails 28 and 30 Rectangular frame 21 is movably mounted on rails 28 and 30. In this regard, there is provided a pair of end wheel and axle assemblies mounted to rectangular frame 21. In particular, as viewed in FIG. 1, there is provided a pair of wheels 32 and 34 that are interconnected by axle 36, with the wheels being movably mounted on rails 26 and 28. Rectangular frame 21 is movably mounted for back and forth lateral movement on axle 36.

Secured to the opposite end of rectangular frame 21 is a second wheel and axle assembly that includes a pair of wheels 38 and 40 converted to a through axle 44 that extends through sleeves 42 connected directly to the rectangular frame 21. Thus, rectangular frame 21 can slide back and forth. A fluid cylinder 44c is attached to axle 44 and includes an actuating rod 44d that connects to the rectangular frame 21. The actuation of rod 44d results in the entire rectangular frame 21 being moved back and forth. It is appreciated that the axle sections 44a and 44b can be extended and contracted with respect to the cylinder 44c. This enables the position of the rectangular frame 21 and the supply tray 12 held thereby to be moved laterally back and forth along rails 28 and 30. To further control the movement of rectangular frame 21 there is provided a second double acting fluid cylinder 46. As seen in FIG. 1, cylinder 46 is connected to axle 36 and is operative to move rectangular frame 21 fore and aftly between rails 28 and 30.

Therefore, it is appreciated that cylinders 44c and 46 are operative to move the supply tray in both X and Y directions about bottom plate 18.

Disposed below bottom plate 18 is a vacuum chamber 50. In fact, flat bottom plate 18 that rests directly underneath supply tray 12 forms the top of the vacuum chamber 50.

Viewing vacuum chamber 50 in more detail, it is seen that the same includes a pair of sidewalls 52 and a pair of end walls 54 and finally, a bottom plate 56. Thus, there is a vacuum area, indicated generally by the numeral 58, defined by the top plate 18, side and end walls 52 and 54 and bottom 56.

Figure 3:
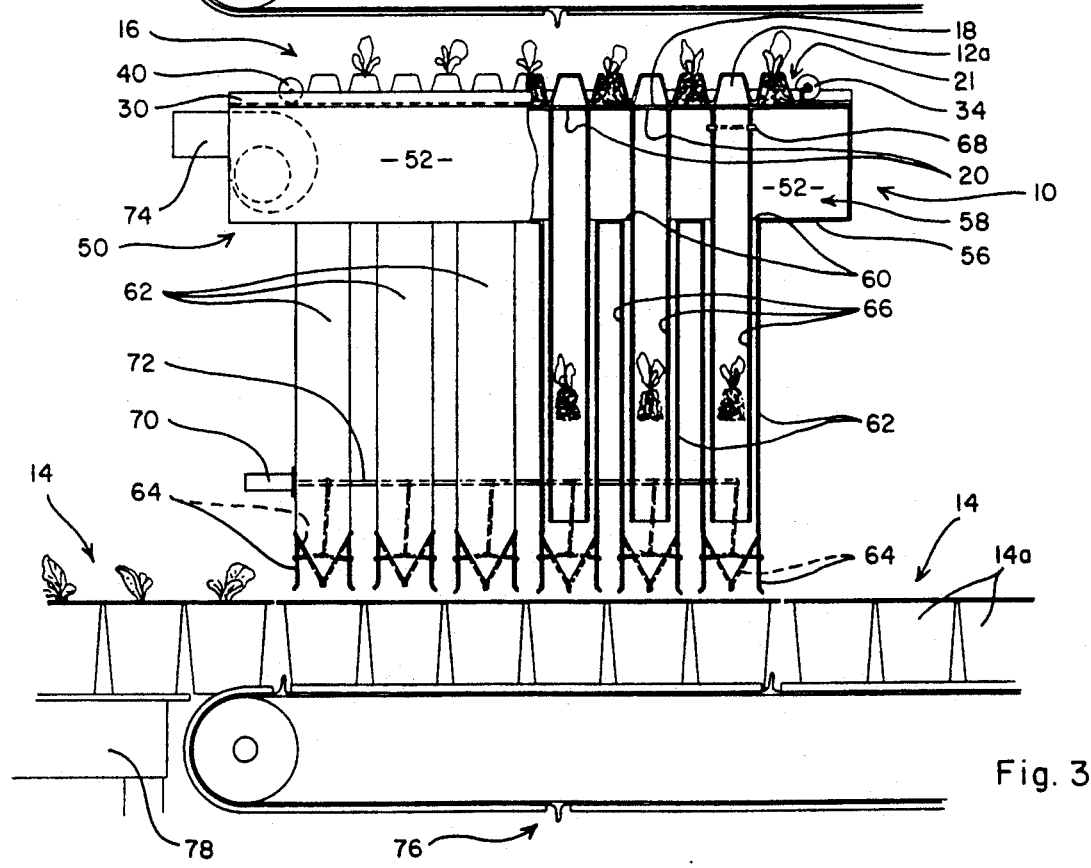
FIG. 3 is a side elevational view of the plant transfer system of the present invention with certain portions shown in sections to better illustrate internal structure of the plant transfer system.

Formed in bottom 56 is a series of openings 60 (FIG. 3). Openings 60 will generally conform in alignment and number with openings 20 formed in flat bottom plate 18. Extending downwardly from the bottom opening 60 is a series of vacuum tubes 62 that include a lower terminal end. Disposed about the lower terminal end of each vacuum tube is an openable and closable door structure or assembly 64.

As particularly illustrated in FIG. 3, there is a series of innerdrop tubes 66 that communicate with the respective openings 20 formed in bottom plate 18 and which extend downwardly therefrom a select distance within the vacuum tubes 62.

The plant transfer system 10 of the present invention includes a door operating system for automatically opening in a selected time sequence the respective doors 64 secured about the terminal ends of vacuum tubes 62. Viewing the door opening system, it is seen that the same includes one or more sensors 68 (FIG. 3). In the case of the present disclosure, only one sensor 68 is shown, this being in a single innerdrop tube 66. However, it is appreciated that if desired, each individual drop tube 66 could be provided with its own independent sensor 68. Sensor 68 would typically be of the photoelectric type and would effectively sense the passing of a dropping potted plant.

Operatively connected to sensor 68 is a actuator 70. Actuator 70 could be of various types, but it is contemplated that in one preferable design embodiment actuator 70 would comprise a solanoid. Actuator 70 is operatively connected to a gang linkage assembly 72 which in turn is operatively connected to each of the door assemblies 64. It is noted in the drawings that there is a plurality of actuators 70 provided, each actuator being operatively connected to a gang linkage assembly 72 that actuates door assemblies 64 disposed along both sides of the gang linkage 72. Moreover, it is appreciated that the circuit interconnecting sensor 68 and actuator 70 may preferably include a conventional time delay device so as to time the opening of doors 64 with the dropping plants.

To generate a vacuum within the vacuum chamber 50, there is provided a vacuum source 74 in the form of an electric motor and associated fan assembly.

Also forming a part of the plant transfer means of the present invention is a lower conveyor means indicated generally by the numeral 76. Conveyor means 76 functions to transfer the respective plant receiving means 14 to an appropriate filling position under the vacuum chamber 50 where the transfer of plants actually takes place. It is appreciated that the conveyor means 76 would be operated in time relationship to the actuation of the vacuum chamber 50. In this regard it should be appreciated that plant transfer system 10 of the present invention is designed so as to fill all of the underlying plant receiving means 14 at the same time. Once the underlying plant receiving means 14 has been filled, then the conveyor means 76 is operative to advance those plants and associated containers from a filling position underneath the vacuum chamber 50 onto an adjacent support 78. After the filled containers have been moved from the filling position underneath the vacuum chamber 50, then the conveyor means 76 is operative to advance a next group of empty containers to the filling position underneath vacuum chamber 50.

Figure 4:
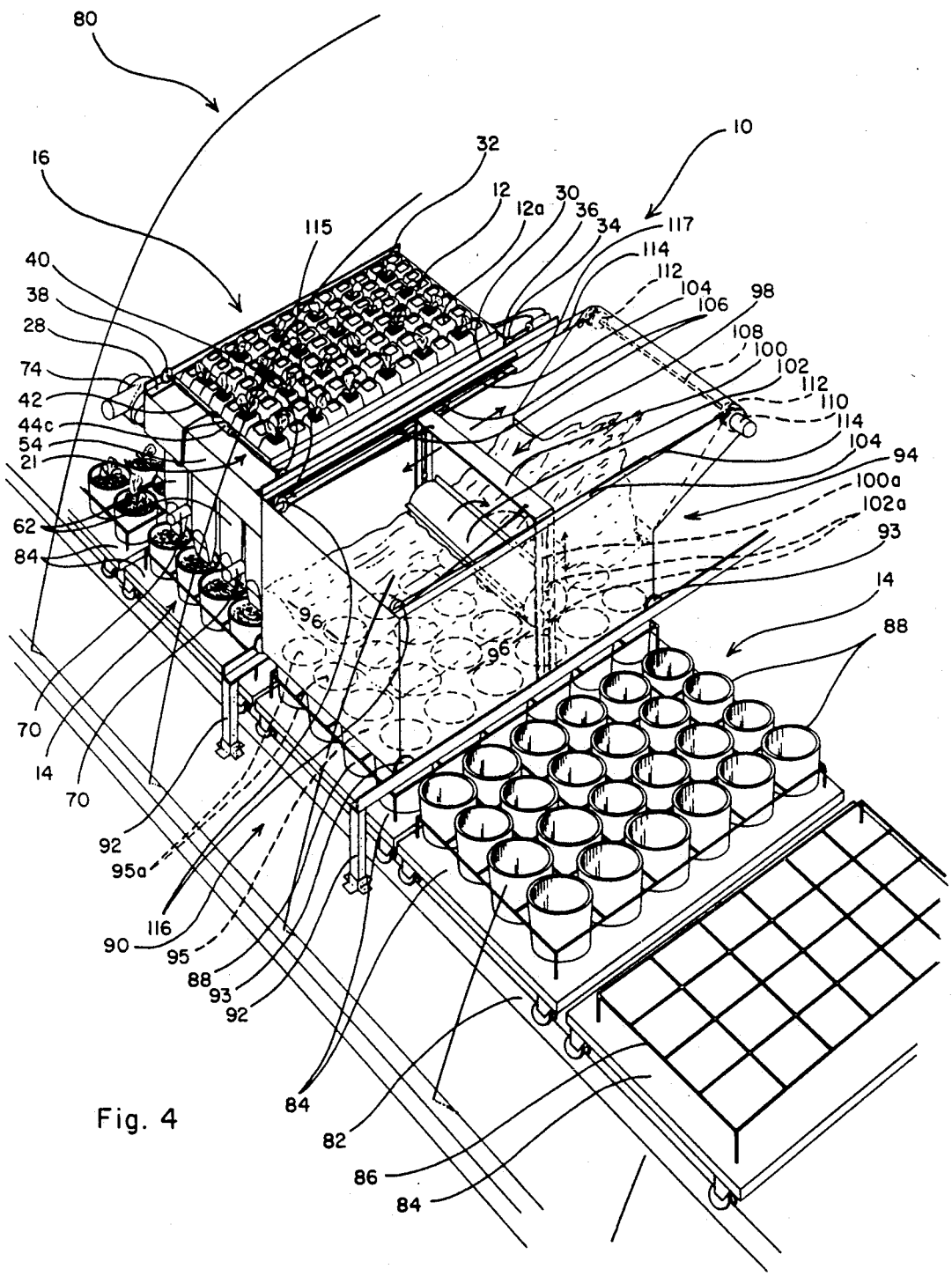
FIG. 4 is a fragmentary perspective view of the plant transfer system of the present invention adapted to be housed and utilized within a greenhouse.

Turning now to FIG. 4, the plant transfer system of the present invention is shown therein disposed within a greenhouse structure indicated generally by the numeral 80. Greenhouse 80 is provided with a rail-type conveyor 82 designed to receive a series of mobile pallets 84. It is seen that in this embodiment that a pot grid 86 is provided on the respective mobile pallets 84. Next, a series of plant pots or containers 88 is inserted within the respective squares of the pot grid 86.

Forming a part of the plant transfer system 10 of the present invention is a soil filling station, indicated generally by the numeral 90. Soil filling station 90 includes a bridge-type frame structure 92 that extends over the pair of conveyor rails 82.

Secured on frame structure 92 is a soil filling apparatus indicated generally by the numeral 94. Soil filling apparatus 94 includes a series of wheels 93 that allow the soil filling apparatus 94 to be moved from one location to another. In particular, it is contemplated that the soil filling apparatus 94 may be moved from one rail system to an adjacent rail system.

Viewing the automatic soil filling apparatus 94 in more detail, it is seen that the same comprises surrounding sidewall structure 96 and a bottom 95 having a series of openings 95a formed therein. The soil filling apparatus defines a container or hopper structure designed to receive soil. Soil packer assembly 98 is movably mounted within the hopper for longitudinal movement between extreme ends of the soil filling apparatus. Soil packer assembly 98 includes a U-shaped carrier frame 100 that is mounted within a pair of opposed longitudinal channels 104. Packer assembly 98 further includes a rotating cylindrical packer 102 that is provided with an internal drive motor that is designed to drive the same in the direction of the arrow shown in FIG. 4. U-shaped carrier frame 100 includes a vertical channel 100a in each leg and the packer cylinder 102 is mounted for adjustable vertical movement within those channels by a series of alignment wheels 102a.

The soil filling apparatus 94 is provided with means for driving the soil packer assembly 98 back and forth between extreme end positions of the soil filling apparatus 94. It should be noted that U-shaped carrier frame 100 includes a pair of wheels 106 secured to each side thereof with the respective wheels being confined within an elongated rail 104 secured to opposite sides of the soil filling apparatus 94. Thus, the entire soil packer assembly 98 can move back and forth within rails 104.

As noted above, the cylinderical packer 102 includes an internal power means for rotating the packer cylinder in the direction of the arrow shown in FIG. 4. Therefore, this rotation alone will cause the soil packer assembly to move from left to right as viewed in FIG. 4. To power the soil packer assembly from right to left, there is provided a cable drive assembly. As seen in FIG. 4, there is provided a rotating shaft 108 that is rotatively journaled and powered by an electric motor 110. Secured to opposite ends of shaft 108 is a pair of pulleys 112. Secured to pulleys 112 is a pair of cables 114 that extend from the respective pulleys 112 to the opposite end of the soil filling apparatus 94 where they are trained around a pair of idler pulleys 116 after which the terminal end of the cables 114 extend back to and connect to the U-shaped carrier frame 100. Therefore, it is appreciated that as shaft 108 is rotated clockwise as viewed in FIG. 4, this rotation results in the carrier frame 100 and soil packer assembly 98 moving right to left as viewed in FIG. 4.

To control this movement, the soil filling apparatus is provided with a pair of switches 115 and 117 secured adjacent to the rail structure 104. Both switches 115 and 117 are operatively connected to electric motor 110. Switch 115, located to the leftmost side as viewed in FIG. 4. When U-shaped carrier frame 100 engages switch 115 electric motor 110 is shut off. The rotating energy of the packer assembly 98 will alone move the same from left to right as viewed in FIG. 4. On the other hand, when the carrier frame 100 engages switch 117, electric motor 10 is turned on and as a result the entire soil packing assembly 98 is caused to move from right to left.

Figure 5:
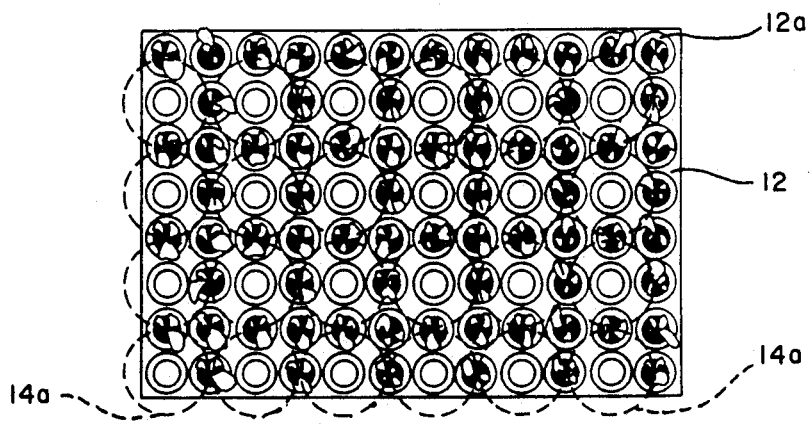
FIG. 5 through 8 are a sequence of views illustrating a series of matrix plant transfers from a supply tray to an underlying filling tray with FIG. 5 illustrating the transfer of a first set of 24 potted plants to the underlying filling tray.

Turning to the operation of the plant transfer system 10 of the present invention, reference is first made to FIGS. 5 through 8. For the sake of explanation, supply tray 12 is provided with 96 plant cavities or individual potted plants. The plant transfer system 10 of the present invention is designed to transfer 24 plants at a time. Thus, as viewed in FIG. 5, supply tray 12 assumes a first position. In that position, a selected matrix of twenty-four potted plants overlies twenty-four openings provided within plate 18 above the vacuum chamber 50. The potted plants overlying the openings 20 within plate 18 are aligned with twenty-four larger receiving pots 14a, as illustrated in FIG. 5. Once in this first position, the vacuum chamber 50 is actuated causing all twenty-four overlying plants to be pulled from the supply tray 12 and directed into the twenty-four underlying pots 14a.

Referring to FIG. 3, the actual transfer of the respective potted plants will be described. In this regard, the vacuum chamber 50 induces respective potted plants from the supply tray 12. The presence of the generated vacuum within chamber 50 results in the respective plants overlying openings 20 in plate 18 being "sucked" downwardly through the respective drop tubes 66. As the potted plants move down the respective drop tubes 66, sensor 68 is actuated and through an appropriate time delay device actuator 70 is actuated resulting in the respective gang linkages 72 being appropriately actuated which in turn results in the respective door assembly 64 being open. The falling potted plants move through the respective doors 64 and are directed into the underlying receiving containers 14a. After the respective potted plants move past the doors 64, the same are closed by an appropriate conventional timing circuit associated with actuators 70.

At this point, the conveyor means 76 is actuated to move the filled underlying plant containers 14a onto an adjacent support 78 and to convey and empty set of containers into the filling position that is defined underneath vacuum chamber 50.

FIG. 5 shows the 24 empty plant cavities, each empty plant cavity representing the transfer on a single potted plant from the supply tray 12 into an underlying aligned receiving container 14a.

Figure 6:
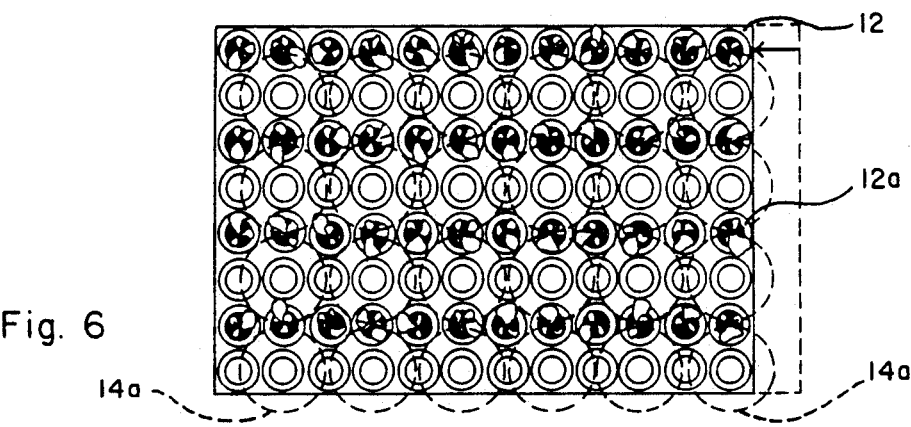
Figure 7:
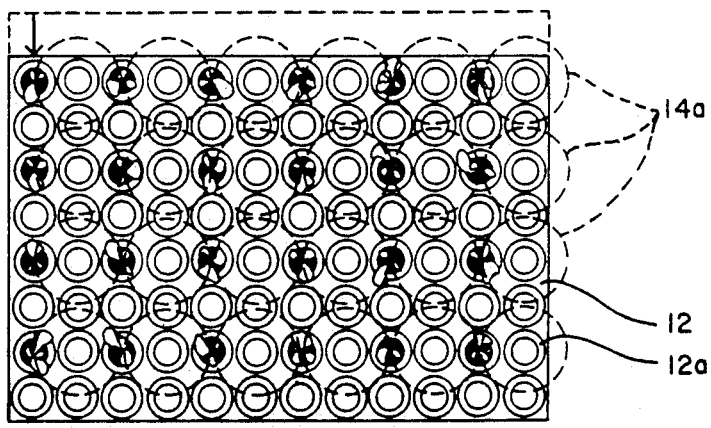
Figure 8:
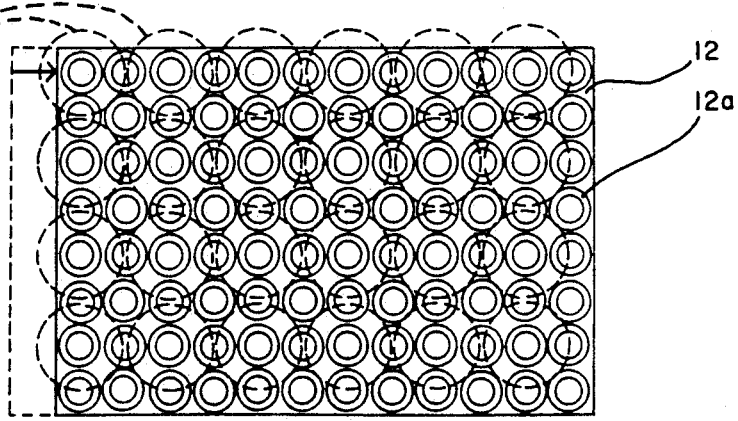

To continue the transfer of potted plants, supply tray holding means 16 is actuated so as to move the entire plant tray 12 one plant or plant cavity increment to the left as illustrated in FIG. 6. This allows twenty-four additional potted plants to be appropriately aligned over the respective openings 20 within plate 18 that overlies vacuum 50. By the same process described herein above, twenty-four additional potted plants are directed into the set of twenty-four filling containers 14a that underly vacuum chamber 50. After this, the supply tray holding means is again actuated and is moved one plant increment downwardly to the position illustrated in FIG. 7. There a third set of twenty-four potted plants are appropriately aligned over the vacuum chamber 50 for transfer. Finally, after the transfer of the third set of twenty-four plants, the plant supply tray holding means 16 is actuated again and moved one plant increment to the right, as illustrated in FIG. 8. In this position, the final or fourth set of twenty-four plants are appropriately aligned for transfer to underlying plant containers 14a.

Once this final set of twenty-four plants has been transferred, then the empty plant supply tray 12 is removed from the supply tray holding means 16 and a new plant tray 12 having a selected number of plants therein is placed within the supply tray holding means 16.

It should be appreciated that the plant transfer system of the present invention can be adapted to accommodate various size plant transfer trays with varying numbers of plant cavities formed therein.

Figure 9:
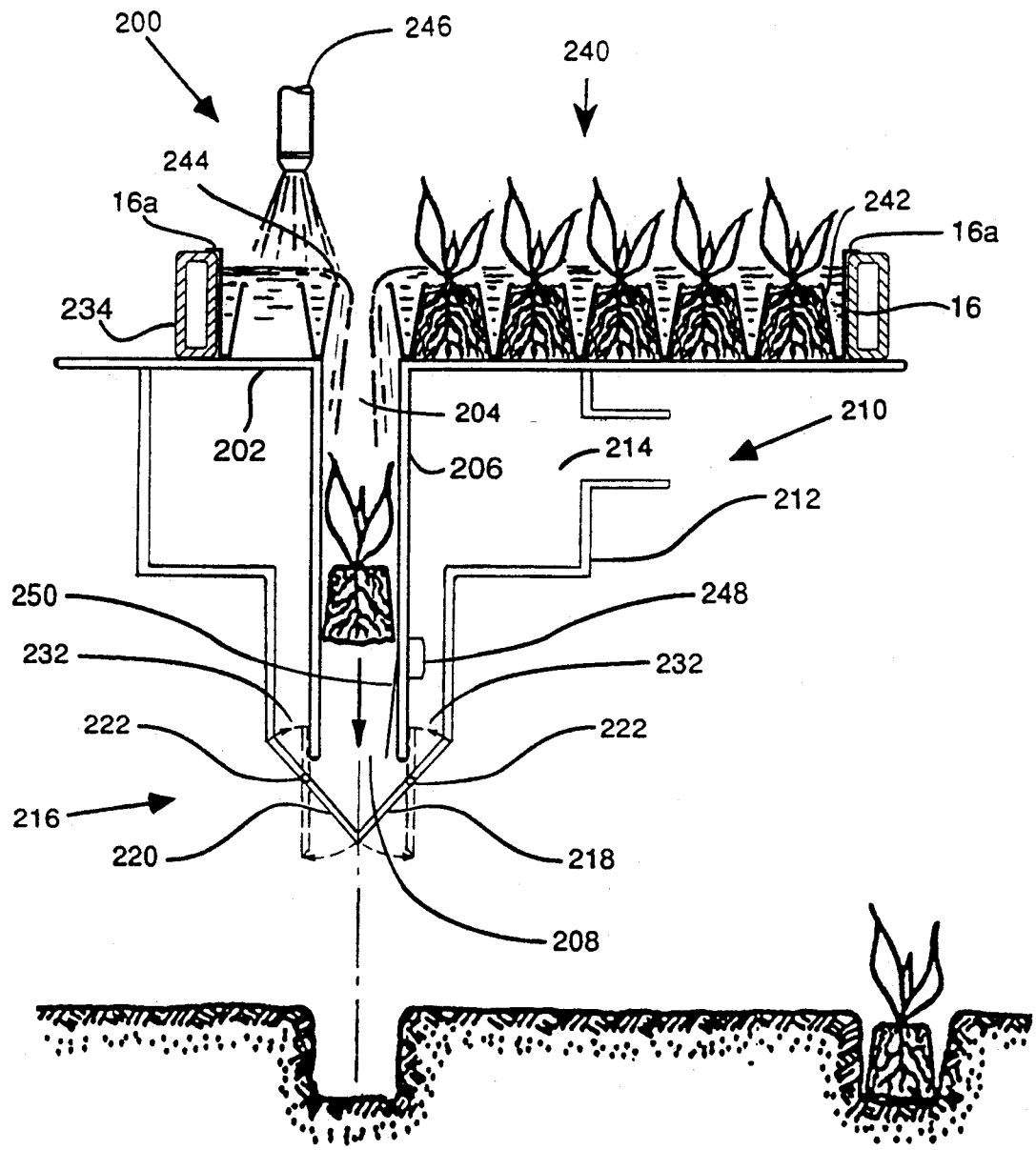
FIG. 9 is a schematic illustration of an alternative plant transfer system.

With reference to FIG. 9, an alternate design for a plant transfer system is shown therein and indicated generally by the numeral 200. As will be understood from subsequent portions of this disclosure, the alternative plant transfer system 200 is designed to simultaneously transfer both the plant and water at one time to a planting area and is designed for use in a field transplanting operation, pot planting operation, or any other type of planting operation.

Now, turning to plant transfer system 200 as shown in FIGS. 9, 9A, 9B and 9C, the plant transfer system shown therein includes a plant bearing plate 202 that is provided with a plant drop opening 204. A drop tube 206 extends downwardly from the plant opening 204 and acts to direct a dropping plant into a planting area or planting cavity. Drop tube 206 includes an outlet end 208 through which the dropping plant passes.

Extending around the lower portion of drop tube 206 and communicatively open to the outlet 208 of the drop tube is a vacuum system indicated generally by the numeral 210. Vacuum system 210 includes a surrounding wall structure 212 that forms an internal vacuum chamber 214. Vacuum chamber 214 maybe opened and closed about the area surrounding the drop tube outlet 208 by a door assembly 216. As seen in the drawings, door assembly 216 includes a pair of cooperating pivotally mounted doors 218 and 220. Each door 218 and 220 is pivotally mounted about a pivot axis 222. In order that the doors 218 and 220 can be simultaneously opened and closed together, there is provided a pair of pivotally connected cross links 224 and 226 that extend between opposite edges of the doors 218 and 220.

As seen in the drawings, when the respective doors 218 and 220 assume an open vertical position there is defined an air opening 232 between the upper portion of the respective doors and the adjacent portion of the wall structure 212 forming the vacuum system 210. Also, it is appreciated that in the open vertical position the upper portion of the doors 218 and 220 abut against and are stopped by the lower portion of the drop tube 206.

To actuate the doors 218 and 220 that is provided and a switch actuator 250 or other sensing means such as photo sensors, pressure sensors, etc. that are secured within the interior plant drop tube 206 about the lower portion thereof. Switch actuator 250 is in turn operatively connected to a micro-switch 248 that is wired to a solenoid switch 230 that is connected to at least one door through a pull arm or connecting arm 228. It is appreciated that the doors could be provided with springs such as torsional springs in order to maintain them in a closed position. But it is appreciated from FIGS. 9, 9A, and 9B that the differential pressure acting on the doors would tend to bias or maintain the doors in a closed position because of the greater surface area disposed below the pivot axis 222 of the respective doors. That is, the atmospheric pressure acting on the doors 218 and 220 would tend to urge the doors to a closed position.

It is appreciated that in lieu of the doors 218 and 220, there could be provided a high pressure air jet curtain that would be directed downwardly and inwardly on each side of the drop tube 206 near the opening 208. This air curtain would effectively seal the system plus it would aid in strengthening suction due to curtain action directing and inducing the plant and water downwardly into the planting area. With reference to FIG. 9C, the plant transfer system of the present invention is shown with a high pressure air jet 221 that is operative to form an air curtain 223. It is appreciated that with this design there would not be a requirement for the cooperating doors.

Returning to the bearing plate 202, it is seen that there is provided an indexing frame 234 that is designed to receive and retain an air-pruning plant tray indicated generally by the numeral 240. As indicated, the plant tray 240 includes a series of air-pruning cells 242 and formed in and around and over the various plant cells 242 is a water holding area 244. Disposed over the plant tray 240 is a water supply 246. It is appreciated that the water supply 246 can be controlled by a valve and float arrangement or other conventional means which would be capable of maintaining the water level within the tray at a selected height.

Turning to the suction system, it is appreciated that the suction system could be continuous or intermittent. In an intermittent vacuum arrangement, a reciprocating piston within a cylinder can be used to generate pulses of vacuum and these intermittent pulses of vacuum would be operative to induce plants downwardly from the plant tray 240 through the drop tube 206.

Figure 11:
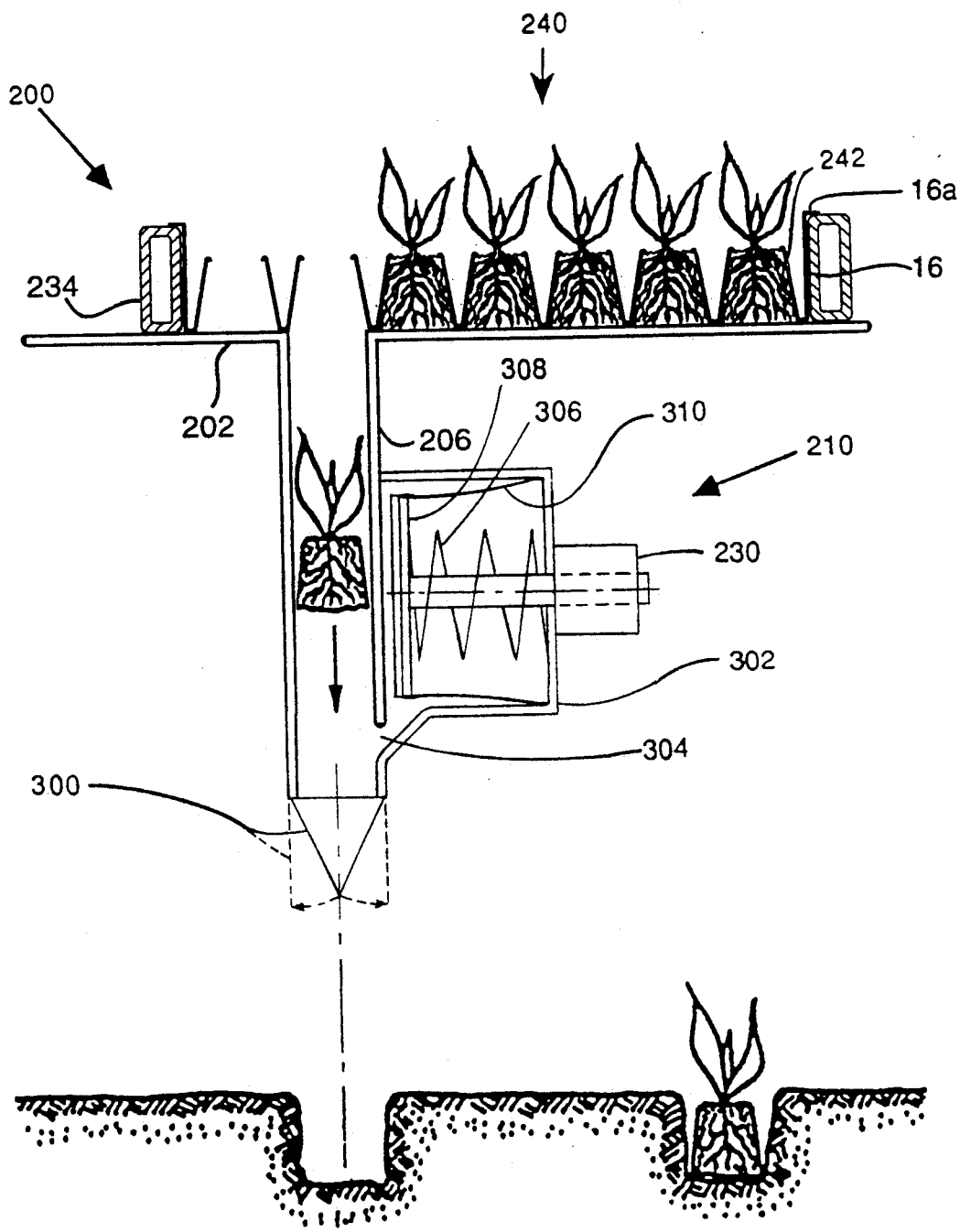
FIG. 11 is a schematic illustration of a plant transfer system having an intermittent vacuum system.

Turning to FIG. 11, there is shown therein an intermittent vacuum arrangement and particularly a reciprocating piston type vacuum system. With respect to this embodiment, it is noted that the disclosure is essentially the same as other plant transfer designs shown and disclosed herein. The basic difference between the embodiment shown in FIG. 11 and the other plant transfer systems disclosed herein is that the design of FIG. 11 does incorporate a reciprocating piston type intermittent vacuum system.

Before looking at the vacuum system in more detail, it is noted that the design of FIG. 11 does incorporate a plant drop tube 206 that is designed to extend from a plan tray bearing surface 202. As shown in FIG. 11, a plant tray 240 is disposed on the plant tray bearing surface 202 and moves there across so that respective plant tray cells 242 align with the drop tube 206. Details of this basic arrangement have already been disclosed herein.

Formed about the lower emote end of the drop tube 206 is a flexible door arrangement indicated by the reference numeral 300. This door design can be constructed of resilient material, plastic or any other suitable material that will close tight as the piston or diaphragm is activated to cause vacuum. This impulse type vacuum will instantly pull down the seeding and ht weight and inertia of the plant will cause the plan to shoot through the door 300 to make the transplanting.

Now turning to the intermittent piston type vacuum system show in FIG. 11, it is seen that the same includes a housing 302 that is secured to the drop tube 206 about the lower portion of the drop tube. The inside of the housing 302 is open to the interior of the drop tube 206 by an opening 304. This permits the vacuum system to draw a vacuum within the drop tube 206. Reciprocally mounted within the housing 302 is a piton assembly indicated generally by the numeral 210. The piston assembly 210 includes a piston plate 308 and a diaphragm structure 310 that is secured to the piston plate 308 and extends therefrom to where an end or edge portion of the diaphragm is connected to the wall structure of the housing 302 to form an airtight assembly in the front portion of the piston as shown in FIG. 11. An electric solenoid 230 of the basic type already discussed in this application is mounted inside the housing 302 and is connected to the piston plate 308. Also a spring 306 is connected between the piston plate 308 and the back of housing 302 and acts to bias the piston plate 308 to an extended position. It is appreciated that the solenoid will be actuated in a synchronized time relationship with the movement of the plant tray 204 that is disposed over the drop tube 206. Essentially, just prior to the dropping of a plant, the piston assembly 210 is actuated to create a vacuum within housing 302 and this same vacuum is effectively transmitted to the interior of the drop tube 206 which causes the plan to be pulled or induced downwardly from the plant cell 242, through the drop tube 206 and through the door structure 300. Once the next succeeding plant cell 242 is properly aligned over the drop tube 206 and the plant transfer system is ready to dispense another plant, the piston type intermittent vacuum system 210 of FIG. 11 is once again actuated so as to induce another plant downwardly through the plant drop tube 206. It is appreciated that various piston type designs can be incorporated to yield an intermittent vacuum producing arrangement.

It is appreciated that in the embodiment illustrated in FIGS. 9, 9A, 9B and 9C that the plant transfer system is designed to deliver both the plant and water simultaneously to a planting area, whether it be in the field, in a pot, etc. The presence of the water is of course important in providing for the well being of the plant after planting but the water also serves to seal the system about the plant tray 240 and consequently contributes to the efficient inducement of plants from the plant tray during a planting operation. Also, the downward force of the water that accompanies the plant tends to provide an opening within the soil or other plant growing medium for receiving the plant. In addition, the downward force of the water tends to cover the plant root area once the plant has been set in the soil or plant growing medium.

Figure 10:
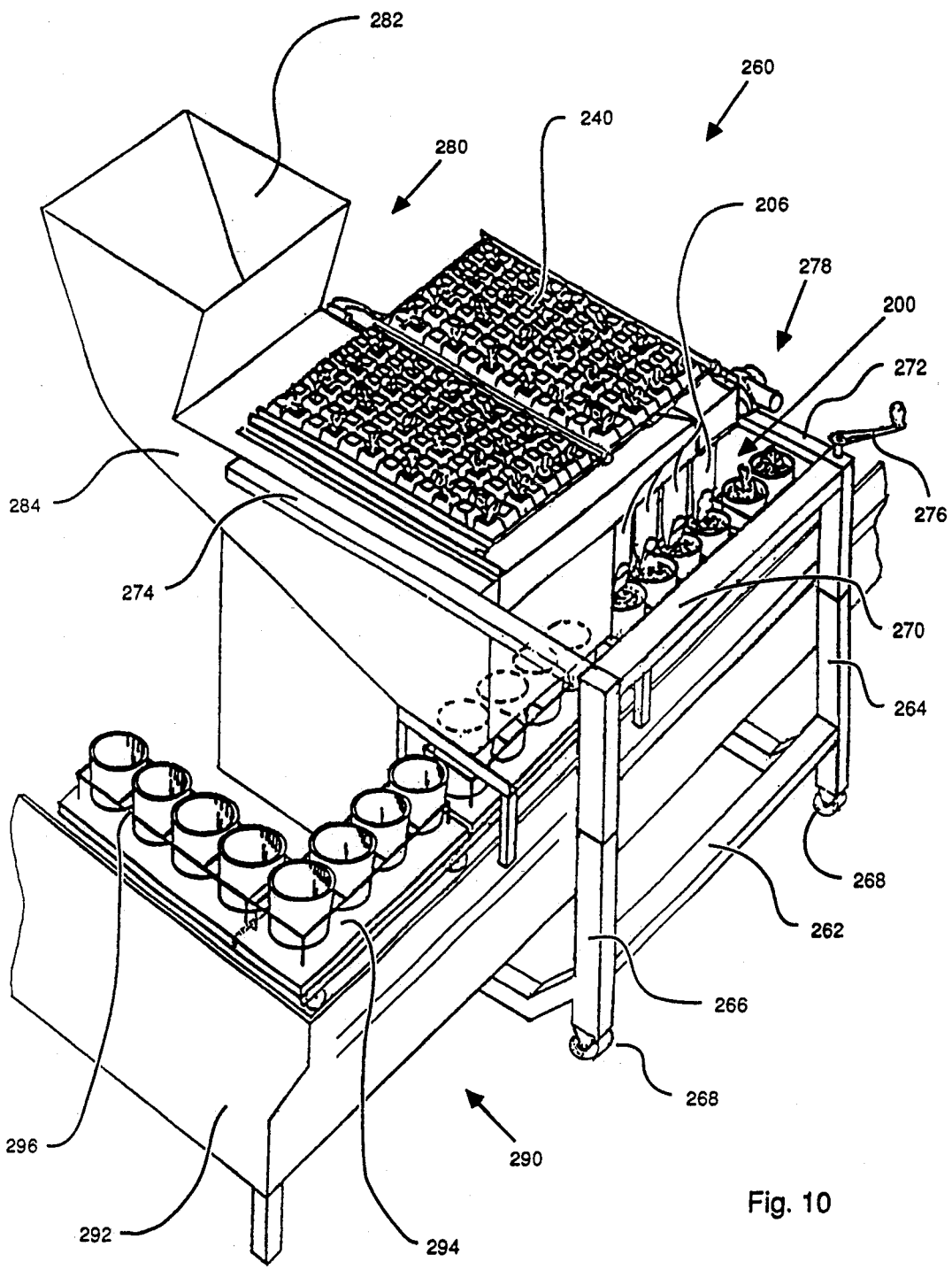
FIG. 10 is a perspective view of a an automatic pot or flat planting system.

Turning to FIG. 10, there is shown therein a pot planting system 260 which is adapted to fill pots with a plant growing medium and also to plant plants within the pots in accordance with the plant transfer system shown in FIGS. 9, 9A, 9B and 9C. Turning to a discussion of the pot planting system 260, it is seen that the same includes a mobile main frame structure that is provided with a lower support 262 that supports a pair of upright lower posts 264 and 266. Posts 264 and 266 include wheels 268 that make the frame structure movable and portable. Connected to posts 264 and 266 is a telescoping upper u-shaped frame structure 270. A pair of laterally spaced arms 272 and 274 are secured to the u-shaped frame 270 and project outwardly therefrom, as shown in FIG. 10. There is provided a height adjustment mechanism 276 that permits upper u-shaped frame 270 to be adjusted vertically up and down.

Carried by arm 272 and 274 is a tray carriage 278. Details of the tray carriage 278 are not dealt with here in detail because such structures are known and as will be appreciated by those skilled in the art, the tray carriage is adapted to move fore and aft as well as side-to-side so as to align specific plants disposed within trays 240 with one or more outlet openings such as the opening 204 forming a part of the plant transfer system of FIG. 9. Disposed below the tray carriage 278 is a plant transfer system indicated generally by the numeral 200. The plant transfer system 200 is not shown in detail in FIG. 10 but the same includes a plurality of drop tubes 206 with the drop tubes and plant transfer system being of the type disclosed in FIG. 9.

Disposed adjacent the tray carriage 278 is a hopper indicated generally by the numeral 280. Hopper 280 includes an upper opening 282 and a wall structure 284. Hopper 280 serves to channel and direct a plant growing medium such as soil, peat moss, etc., downwardly into planting pots that are to receive plants from the plant trays 240.

As shown in FIG. 10, there is provided as a part of the pot planting system 260 of the present invention, a pot conveying system indicated generally by the numeral 290. Pot conveying system 290 includes a frame structure 292 for supporting a conveyor 294 that is designed to receive and convey plant pots through the pot planting system. As seen in FIG. 10, the conveyor system includes a grate structure 296 for retaining and holding the various pots on the conveyor 294.

As seen in FIG. 10, the pots are first conveyed underneath the hopper 280 where through a conventional pot filling process the respective pots are filled with a selected plant growing medium such as soil, peat moss, etc. Once the pots have been filled with a plant growing medium they are conveyed sequentially underneath the series of drop tubes 206 that form a part of the plant transfer system such as that shown in FIGS. 9, 9A, 9B and 9C. In the manner described with respect to the system shown in FIG. 9, plants and water are induced from the respective plant trays and pass through the respective drop tubes 206 to where the plants along with water is received by the pots. Once the plant has been directed into the pot, the respective pots are transferred to a collecting, storage or packing area.

In lieu of the vacuum system shown in FIG. 9, it should be pointed out that the plant transfer system of the present invention could be provided with a pressure chamber that would be disposed above the plant tray and would exert a downward force on the plants and as such, would provide the force for directing or inducing the respective plants from the plant tray.

From the foregoing discussion, it is appreciated that the plant transfer system shown in FIGS. 9, 9A, 9B and 9C have the advantage of simultaneously planting the plants and providing water to the plant as the plant and water are simultaneously directed down the drop tube 206 into the planting area. This greatly increases the chances of the plant surviving and having a healthy life and assists ground opening for the plant and covering of planted roots. In addition, the presence of the water within the tray structure itself forms a seal about the tray and greatly increases the effectiveness of inducing the respective plants from the plant tray 204. Finally, the plant transfer system for pots shown in FIG. 10 presents a very effective and efficient means for filling pots with a growing medium as well as planting plants within that growing medium, all in the one basic operation.

The present invention may, of course, carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A plant transfer system for simultaneously delivering a plant and water form a plant tray to a planting area comprising:
   a. a support structure holding and supporting the plant tray;
   b. a water supply;
   c. means for directing water from the water supply onto and into the plant tray where the water may accumulate therein;
   d. at least one drop tube extending downwardly form the support structure and including an outlet end;
   e. vacuum means for inducing both a plant and water from the plant tray and directing both the plant and water together down the drop tube into a planting area underlying the drop tube; and
   f. wherein the water within the plant tray tends to assist in sealing the vacuum generated by the vacuum means.

2. The plant transfer system of claim 1 wherein there is provided a pair of pivotally mounted cooperating doors secured about the outlet end of the drop tube and movable between a closed and open position.

3. The plant transfer system of claim 2 wherein there is provided a vacuum chamber operatively associated with the vacuum means; and wherein in the open position the cooperating doors form an air opening between at least one door an the vacuum chamber such that atmospheric air can be induced through the air opening when the doors are in an open position.

4. The plant transfer system of claim 2 wherein there is provided at least one connecting link extending between the doors such that the doors can be simultaneously opened and closed by actuating one door only.

5. The plant transfer system of claim 2 wherein the drop tube includes a pair of side cutouts and wherein in the closed position the respective doors abut against and close the cutouts.

6. The plant transfer system of claim 1 wherein there is provided an air jet disposed about the outlet end of the drop tube and wherein the air jet provides an air curtain seal about the outlet end of the drop tube and tends to assist in the injection of the plant and water.

7. A method of planting a plant and simultaneously delivering water with the plant to a planting area comprising:
   a. supplying water to a plant tray and accumulating water within the plant tray; and
   b. inducing both a plant and water simultaneously from the plant tray by vacuum means and directing both the plant and water downwardly into a planting area.

8. The method of claim 7 including the step of directing both the plant and accompanying water down a drop tube.

9. The method of claim 7 including the step of directing the plant and water into a field planting area.

10. The method of claim 7 including the step of directing the plant and water into a pot having a plant growing medium therein.

* * * * *